(12) United States Patent
Pan et al.

(10) Patent No.: US 12,253,628 B2
(45) Date of Patent: Mar. 18, 2025

(54) METHODS AND APPARATUSES FOR IMPROVED OPTICAL COMPONENT RETENTION AND ALIGNMENT IN A LiDAR SYSTEM

(71) Applicant: Beijing Voyager Technology Co., Ltd., Beijing (CN)

(72) Inventors: Anan Pan, Mountain View, CA (US); Henghui Jiang, Mountain View, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 972 days.

(21) Appl. No.: 17/327,006

(22) Filed: May 21, 2021

(65) Prior Publication Data

US 2022/0373647 A1    Nov. 24, 2022

(51) Int. Cl.
| | |
|---|---|
| G01S 7/48 | (2006.01) |
| G01S 7/481 | (2006.01) |
| G01S 17/89 | (2020.01) |
| G01S 17/931 | (2020.01) |
| G02B 7/02 | (2021.01) |
| G02B 27/10 | (2006.01) |

(52) U.S. Cl.
CPC .............. *G01S 7/481* (2013.01); *G01S 17/89* (2013.01); *G01S 17/931* (2020.01); *G02B 7/02* (2013.01); *G02B 27/10* (2013.01)

(58) Field of Classification Search
None
See application file for complete search history.

(56) References Cited

U.S. PATENT DOCUMENTS

2020/0049800 A1   2/2020   Valouch et al.
2020/0182975 A1   6/2020   Wang et al.

FOREIGN PATENT DOCUMENTS

| KR | 200314084 Y1 | 5/2003 |
| KR | 20100112388 A | 10/2010 |
| WO | 2020101760 A2 | 5/2020 |

OTHER PUBLICATIONS

PCT/US2022/029690, "International Preliminary Report on Patentability", Nov. 30, 2023, 6 pages.
PCT/US2022/029690, "International Search Report and Written Opinion", Sep. 8, 2022, 9 pages.

*Primary Examiner* — Hovhannes Baghdasaryan
(74) *Attorney, Agent, or Firm* — Kilpatrick Townsend & Stockton LLP

(57) ABSTRACT

A LiDAR system may include an optical component module including a housing including a plurality of slots and a plurality of posts. A first spring may be coupled to a first post at a first radial orientation so that the first spring extends into a first slot of the plurality of slots. A second identical spring may be coupled to a second post in a second radial orientation, different than the first radial orientation, so that the second spring extends into a second slot of the plurality of slots. A first optical component may be positioned in the first slot so that the first spring exerts a first clamping force retaining the first optical component within the first slot, and a second optical component may be positioned in the second slot so that the second spring exerts a second clamping force retaining the second optical component within the second slot.

20 Claims, 9 Drawing Sheets

METHODS AND APPARATUSES FOR IMPROVED OPTICAL COMPONENT RETENTION AND ALIGNMENT IN A LiDAR SYSTEM

BACKGROUND

Modern vehicles are often equipped with sensors designed to detect objects and landscape features around the vehicle in real-time to enable technologies such as lane change assistance, collision avoidance, and autonomous driving. A commonly used sensor is a light detection and ranging (LiDAR) system.

A LiDAR system may include a light source, also referred to as a transmission module (TX module), and a light detection system, also referred to as a detection module (also referred to as a receiver (RX) module), to estimate distances to environmental features (e.g., pedestrians, vehicles, structures, plants, etc.). The emitted laser beam from the TX module is transmitted through a series of optical components and used to illuminate a target and the RX module receives the reflections from the laser beam through the same or a different series of optical components used by the TX module in order for the LiDAR system to measure the time it takes for the transmitted laser beam to arrive at the target and then return to the detection module. In some LiDAR systems, the laser beam may be steered across a region of interest according to a scanning pattern to generate a "point cloud" that includes a collection of data points corresponding to target points in the region of interest. The data points in the point cloud may be dynamically and continuously updated, and may be used to estimate, for example, a distance, dimension, and location of an object relative to the LiDAR system, often with very high fidelity (e.g., within about 5 cm) due to the precision and the optical alignment of the components, including the TX module, RX module, and one or more optical components, e.g. lens.

BRIEF SUMMARY

In some embodiments, the present technology relates to a method of retaining optical components within a housing. The housing may include a plurality of slots and a plurality of posts. The method may include one or more steps including coupling a first spring of a plurality of springs to a first post of the plurality of posts at a first radial orientation relative to a longitudinal axis of the housing so that the first spring extends into a first slot of the plurality of slots. The method steps may also include coupling a second spring of the plurality of springs to a second post of the plurality of post in a second radial orientation relative to the longitudinal axis of the housing, different than the first radial orientation, so that the second spring extends into a second slot of the plurality of slots. The method steps may also include inserting a first optical component into the first slot so that the first spring exerts a first clamping force in order to retain the first optical component within the first slot. The method steps may also include inserting a second optical component into the second slot so that the second spring exerts a second clamping force in order to retain the second optical component within the second slot. In some embodiment, the first spring and the second spring may be identical or substantially identical.

In some embodiments, the first spring and the second spring each may each include a mounting portion defining a hole, and an arced contact portion extending form the mounting portion. In some embodiments, coupling the first spring to the first post may include forming a press fit between the hole of the mounting portion of the first spring and the first post. In some embodiments, coupling the second spring to the second post may include forming a press fit between the hole of the mounting portion of the second spring and the second post. In some embodiments, inserting the first optical component into the first slot includes compressing the arced contact portion of the first spring in order to generate the first clamping force retaining the first optical component within the first slot. In some embodiments, inserting the second optical component into the second slot may include compressing the arced contact portion of the second spring in order to generate the second clamping force retaining the second optical component within the second slot. In some embodiments, the first slot may define a first slot depth between a first slot side and a first spring side. In some embodiments, the second slot may define a second slot depth between a second slot side and a second spring side. In some embodiments, a first uncompressed spring distance may be defined between the contact portion of the first spring and the first slot side. In some embodiments, a second uncompressed spring distance may be defined between the contact portion of the second spring and the second slot side. In some embodiments, the first slot depth may be different than the second slot depth or the first uncompressed spring distance may be different than the second uncompressed spring distance. In some embodiments, the first slot depth may be the same as the second slot depth. In some embodiments, the first uncompressed spring distance may be different than the second uncompressed spring distance. In some embodiments, the first uncompressed spring distance may be the same as the second uncompressed spring distance. In some embodiments, the first slot depth may be different than the second slot depth.

In some embodiments, the first optical component may define a first peripheral thickness retained between the contact portion of the first spring and the first slot side. In some embodiments, the second optical component may define a second peripheral thickness, different than the first peripheral thickness, retained between the contact portion of the second spring and the second slot side.

In some embodiments, the first spring and the second spring are identical. In some embodiments, no adhesives are used to bond the first optical component nor the second optical component to the housing or to the first or second springs. In some embodiments, the first optical component and the second optical component may each include at least one of a lens, a filter, or a beam splitter.

In some embodiments, the present technology may relate to a LiDAR system. A LiDAR system may include a chassis, an optical component module coupled to a chassis, and a detection or transmission module designed to be optically aligned with the optical component module so that a path of a laser beam emitted from a laser module of the transmission module is oriented with an optical path in the optical component module to a detection sensor of the detection module. The optical component module may include a housing including a plurality of slots and a plurality of posts. A first spring of a plurality of springs may be coupled to a first post of the plurality of posts at a first radial orientation relative to a longitudinal axis of the housing so that the first spring extends into a first slot of the plurality of slots. A second spring of the plurality of springs may be coupled to a second post of the plurality of post in a second radial orientation relative to the longitudinal axis of the housing, different than the first radial orientation, so that the second spring extends into a second slot of the plurality of slots. A first optical component may be positioned in the first slot so that the first spring exerts a first clamping force retaining the first optical component within the first slot, and a second optical component may be positioned in the second slot so that the second spring exerts a second clamping force retaining the second optical component within the second slot, wherein the first spring and the second spring are identical or substantially identical.

In some embodiments, the first spring and the second spring may each include a mounting portion defining a hole, and an arced contact portion extending form the mounting portion. The first spring may be coupled to the first post with a press fit between the hole of the mounting portion of the first spring and the first post, and the second spring may be coupled to the second post with a press fit between the hole of the mounting portion of the second spring and the second post. The first optical component may compress the arced contact portion of the first spring in order to generate the first clamping force retaining the first optical component within the first slot. The second optical component may compress the arced contact portion of the second spring in order to generate the second clamping force retaining the second optical component within the second slot.

In some embodiments, the first slot may define a first slot depth between a first slot side and a first spring side. In some embodiments, the second slot may define a second slot depth between a second slot side and a second spring side. In some embodiments, a first uncompressed spring distance may be defined between the contact portion of the first spring and the first slot side. In some embodiments, a second uncompressed spring distance may be defined between the contact portion of the second spring and the second slot side. In some embodiments, the first slot depth may be different than the second slot depth or the first uncompressed spring distance may be different than the second uncompressed spring distance. The first slot depth may be the same as the second slot depth, and the first uncompressed spring distance may be different than the second uncompressed spring distance. The first uncompressed spring distance may be the same as the second uncompressed spring distance, and the first slot depth may be different than the second slot depth. The first optical component may define a first peripheral thickness retained between the contact portion of the first spring and the first slot side, and the second optical component may defines a second peripheral thickness, different than the first peripheral thickness, retained between the contact portion of the second spring and the second slot side. In some embodiments, the first spring and the second spring may be identical.

In some embodiments, no adhesives are used to retain the first optical component nor the second optical component within the housing or to the first or second springs. In some embodiments, the first optical component and the second optical component each include at least one of a lens, a filter, or a beam splitter.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which.

Throughout the drawings, it should be noted that like reference numbers are typically used to depict the same or similar elements, features, and structures.

DETAILED DESCRIPTION

Figure 1A:
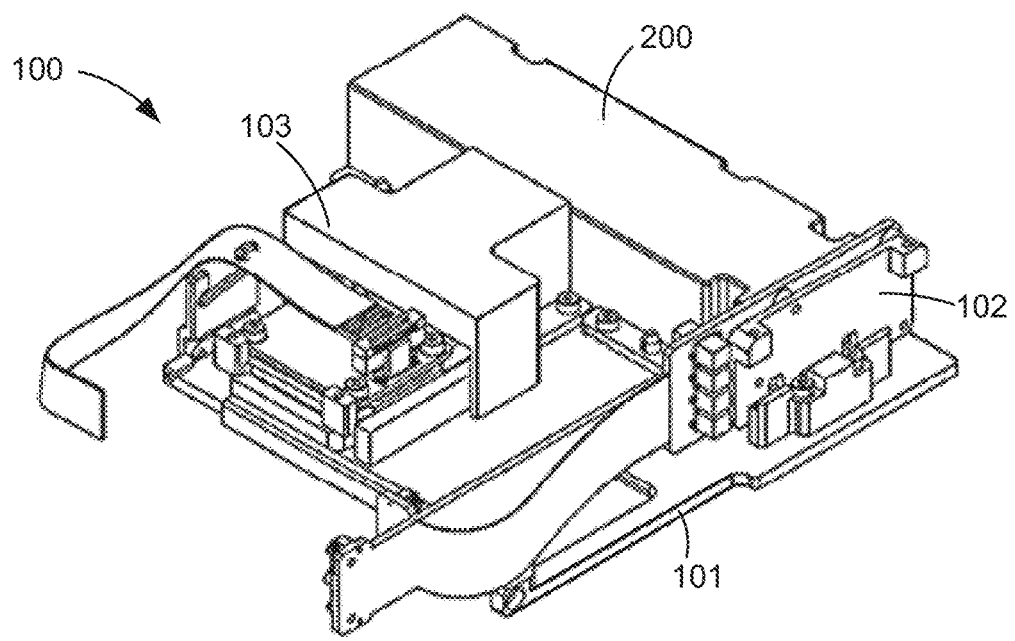
FIGS. 1A and 1B show a TX/RX module of an autonomous vehicle LiDAR assembly according to embodiments of the present technology.

Aspects of the present disclosure relate generally to optical alignment and retention of optical components, for example lens, in an optical component module optically coupled to a detection module and/or transmission modules of a LiDAR assembly. The detection module and transmission module are optically aligned relative to one or more optical component modules.

In the following description, various examples of aligning and retaining optical components to an optical component module are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high-level summary is intended to provide a basic understanding of some of the novel innovations depicted in the Figures and presented in the corresponding descriptions provided below.

Generally, aspects of the technology are directed to implementations of retaining a plurality of optical components, for example lens, within a housing using a plurality of substantially identical springs. The assembly of the optical components, springs and housing is referred to as an optical component module. The optical component module is coupled to a chassis which is also coupled to a detection module and/or a transmission module. The optical component module is optically aligned with the detection module and/or a transmission module. For example, a Light Detection and Ranging (LiDAR) assembly of an autonomous vehicle may include a detection module, also referred to as a receiving module (RX), and a transmission module (TX), or a combination transmission and receiving module (TX/RX). The detection module comprises a detection circuit board assembly, for example a shown in FIG. 1A. A laser beam emitted from a transmission module is directed through an optical path of an optical component module, emitted from the optical component module, reflected off of an object in the environment and returns through an optical path of the optical component module to a detection sensor on the detection circuit board assembly. Due to the precision needed for the LiDAR to accurately perform measurements, it is important for the optical alignment of the optical components directing the beam to and from the detection and transmission modules to be precise and maintained during extended periods of use of the LiDAR. Further, it is beneficial for the optical components to be easily individual removed, for example for repair, replacement and/or realignment. The disclosed optical component module, through the use of substantially identical springs retaining optical components allow for easy insertion and removable of optical components without the use of adhesives and without damaging the optical components. The Figures are further described in greater detail below and the scope of the various embodiments of the present invention is not limited by this summary, which merely operates to present a high-level understanding of some of the novel concepts that follow.

Figure 1B:
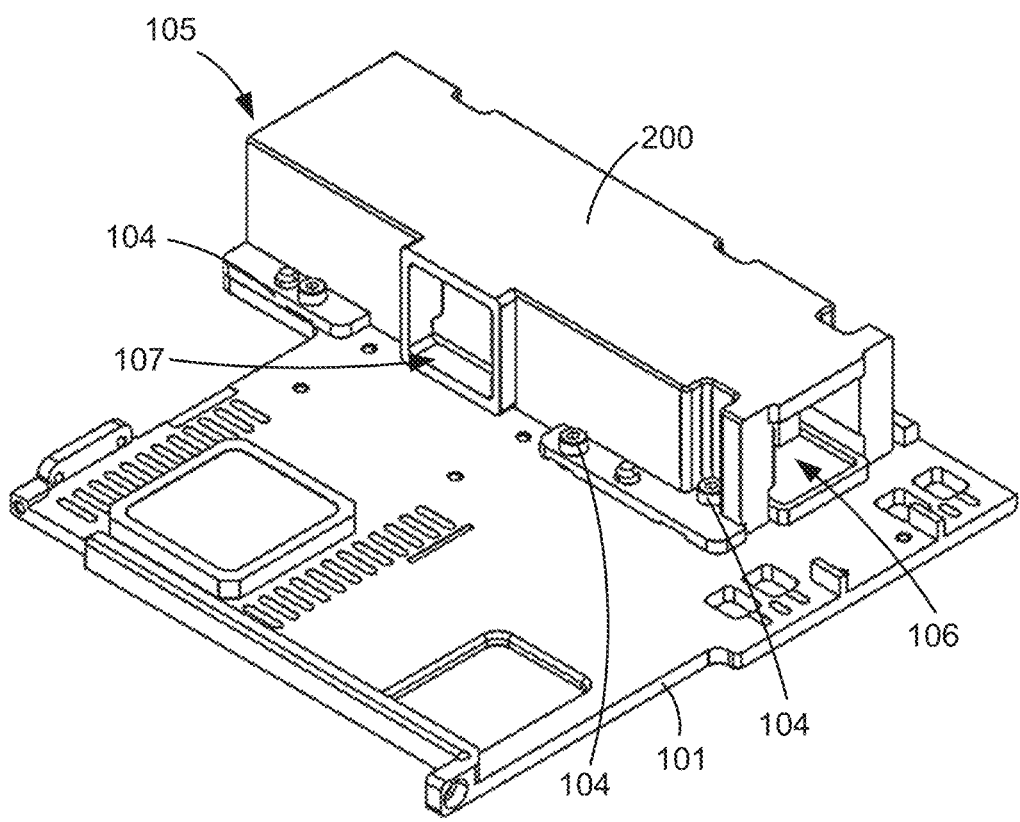

FIG. 1A shows a portion of a TX/RX module 100 of an autonomous vehicle LiDAR assembly. In some embodiments, the present technology may be directed to a TX module and/or a separate RX module. In some embodiments, the present technology may be directed toward optical assemblies in technologies other than LiDAR. As shown in FIG. 1A, the TX/RX module 100 comprises a chassis 101, an optical component module 200, a detection module 102, and a transmissions module 103. In use, a laser beam is emitted from the transmission module 103 and directed through an optical path of the optical component module 200, emitted into the surrounding environment from the TX/RX module 100, reflected off of an object in the surrounding environment, returned to the TX/RX module 100 through the optical component module 200 to a detection sensor of the detection module 102. FIG. 1B shows a portion of the TX/RX module 100 of the autonomous vehicle LiDAR assembly with the detection module 102 and the transmission module 103 omitted for clarity in order to show the optical component module 200. As shown, the optical component module 200 may be fixedly secured to the chassis 101 with fasteners 104 so that the optical component module is aligned with the detection module 102 and the transmission module 103. Further, as shown, and as will be discussed in greater detail below, the optical component module 200 defines apertures 105, 106 and 107 at locations corresponding to the environment, the detection module 102 and the transmission module 103, respectively.

Figure 2A:
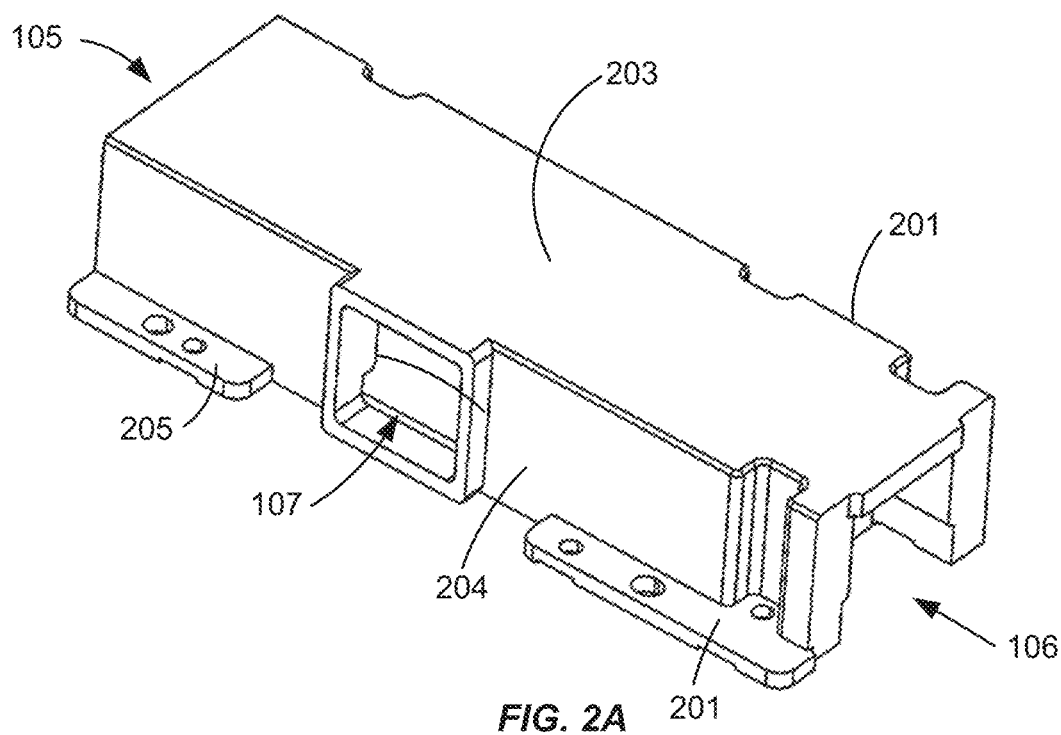
FIGS. 2A-2C show an optical component module of an autonomous vehicle LiDAR assembly according to embodiments of the present technology.
Figure 2B:
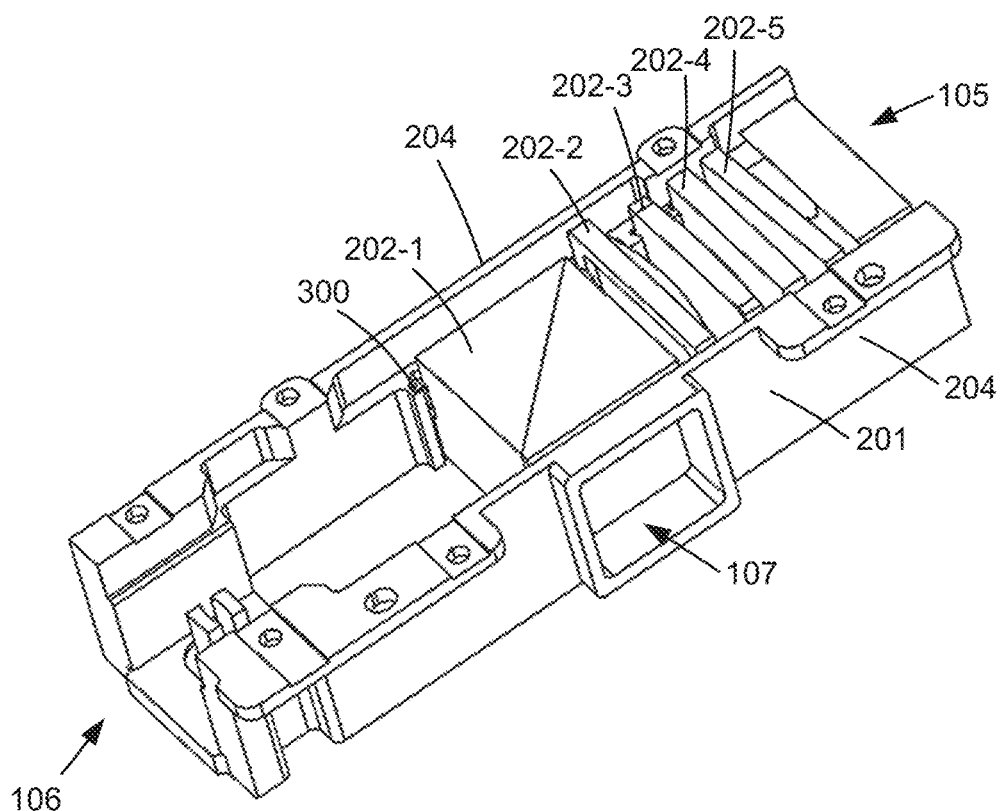
Figure 2C:
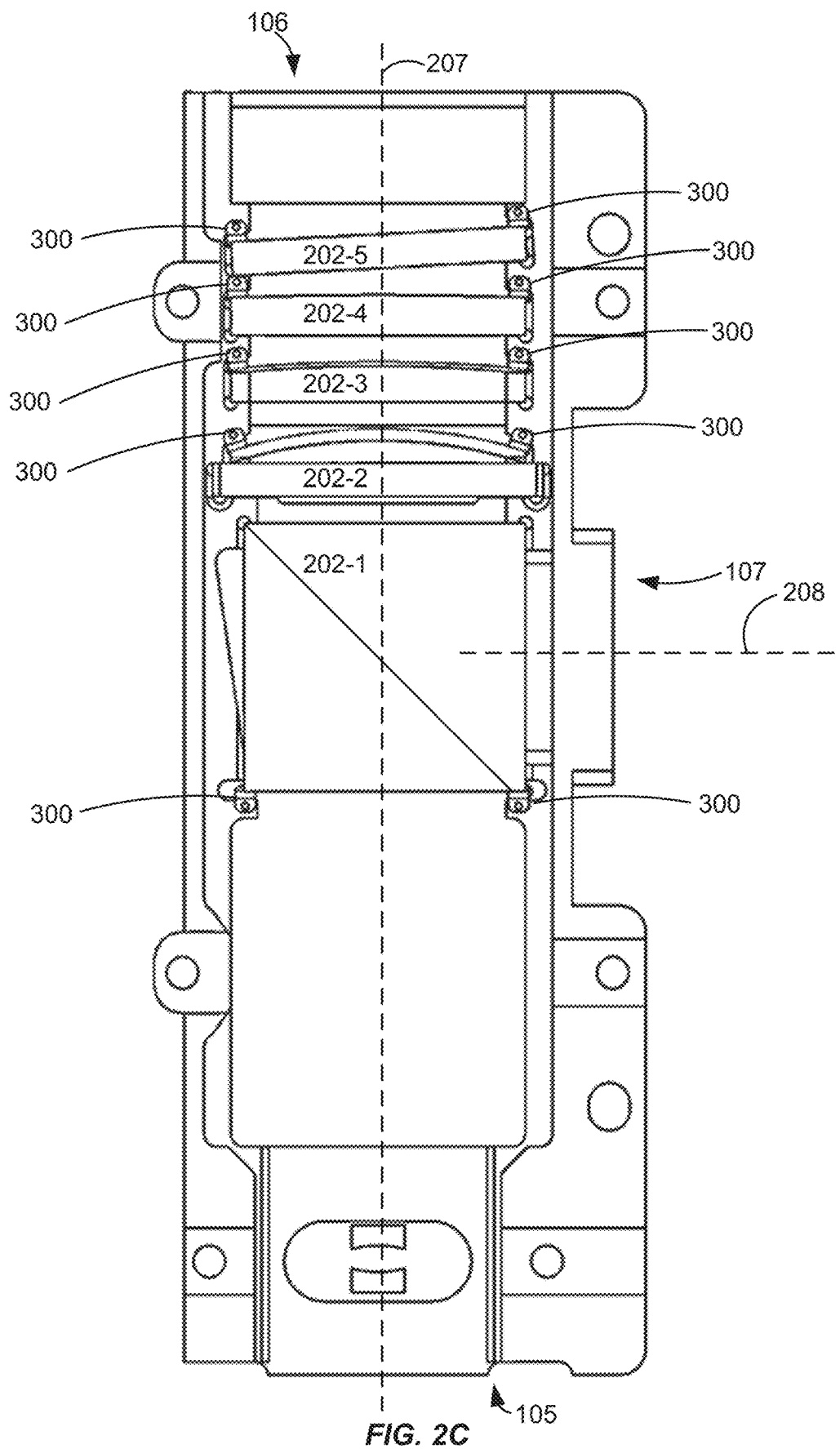

An optical component module may comprise a housing and one or more optical components retained within the housing. The optical components may each be retained within the housing with one or more springs, without the use of adhesives directly bonded to the optical components. FIGS. 2A-2C show views of an embodiment of an optical component module 200, for example as shown in FIGS. 1A and 1B. The optical component module 200 may include a housing 201 and one or more optical components 202 retained within the housing 201 with springs 300.

FIG. 2A shows a top perspective view and FIG. 2B shows a bottom perspective view of an embodiment of an optical component module 200. As shown, the housing 201 includes a top side 203 and two sidewalls 204. As shown, the top side 203 and sidewalls 204 may each be generally rectangular. The sidewalls 204 may extend generally perpendicularly from the top side 203 in order to define an interior cavity of the housing 201 which is open on the bottom side, opposite the top side 203, and open at longitudinal opposite ends of the housing 201 between the sidewalls 204. In embodiments, the interior cavity may be between 85 mm and 95 mm long between the longitudinal ends, between 18 mm and 22 mm high between the top side 203 and open bottom side, and between 22 mm and 32 mm wide between the opposing sidewalls 204. The housing 201 may further includes flanges 205 extending away from the interior cavity from ends of the sidewalls 204 opposite the top side 203. The flanges 205 may define a planar base of the housing 201 in order to contact the chassis 101, as shown for example in FIGS. 1A and 1B. The flanges 205 may define holes 206 for the fasteners 104 to extend through, as shown for example in FIGS. 1A and 1B.

The optical components 202 may each be retained within the housing 201 with one or more springs 300. In the bottom side view of the optical component module shown in FIG. 2C, each of the optical components 202-1-202-5 are retained in the housing with two springs 300, as will be discussed in greater detail below.

The housing 201 may define a first aperture 105 at the first open longitudinal end of the housing between the sidewalls 204, and a second aperture 106 at the second open longitudinal end between the two sidewalls 204 at the opposite end of the housing 201. Further, one or more of the sidewalls 204 may define a third aperture 107. The first second and third apertures 105 106 107 define paths for light to enter and exit the interior cavity of the housing 201 in order to pass through the optical components 202 retained within the housing 201. In embodiments, the first aperture 105 may be referred to as an environment aperture, and light may enter/exit the interior cavity in the housing 201 through the first aperture 105 from the environment. As discussed above, this light entering the first aperture 105 may be reflected light from light emitted from the transmission module 103 through the optical component module 200 and out the first aperture 105. In embodiments, the second aperture 106 may be referred to as an RX aperture, and light may exit the interior cavity in the housing 201 through the second aperture 106 into the RX module 102.

In embodiments, the third aperture 107 may be referred to as a TX aperture, and light may enter the interior cavity in the housing through the third aperture 107 from the TX module 103. As shown, the third aperture 107 may be defined by a rectangular opening in one of the sidewalls 204.

The optical component module 200, by way of the type and orientations of the optical components 202, and the locations of the first, second and third aperture 105 106 and 107, may define a primary optical axis 207, and a secondary optical axis 208, as shown for example in FIG. 2C. The primary optical axis 207 may extend in the longitudinal direction of the housing 201 from the first aperture 105, through one or more of the optical components 202 to the second aperture 106. The optical components 202 may be retained by the springs 300 in an aligned configuration in order to direct light entering the first aperture 105 along the primary optical axis 207 to the second aperture 106. As shown in FIG. 2C, in embodiments, the primary optical axis 207 may coincide with a longitudinal axis of the housing 201. The secondary optical axis 208 may extend at an angle from the primary optical axis 207 to the third aperture 107. In embodiments, the optical components 202 include a beam splitter 202-1 defining the intersection of the primary optical axis 207 and the secondary optical axis 208. In embodiments, for example as shown, the beam splitter 202-1 defines a 90 degree angle between the primary optical axis 207 and the secondary optical axis 208. The optical components 202 may be retained by the springs 300 in an aligned configuration in order to direct light entering the third aperture 107 along the secondary optical axis 208 and into the beam splitter 202-1 to be redirected along the primary optical axis 207 to the first aperture 105. As will be discussed in greater detail below, and as shown in FIG. 2C, two springs 300 may be used to retain the beam splitter 202-1 within the housing 201 so that the both primary optical axis 207, and a secondary optical axis 208 are aligned with the apertures. Further, as will be discussed in greater detail below, and as shown in FIG. 2C, two springs 300 may be used to retain each of the other optical component 202-2-202-5 within the housing 201 so a beam of light is aligned to pass between the first and second apertures 105 and 106 through the primary optical axis 207.

Figure 3A:
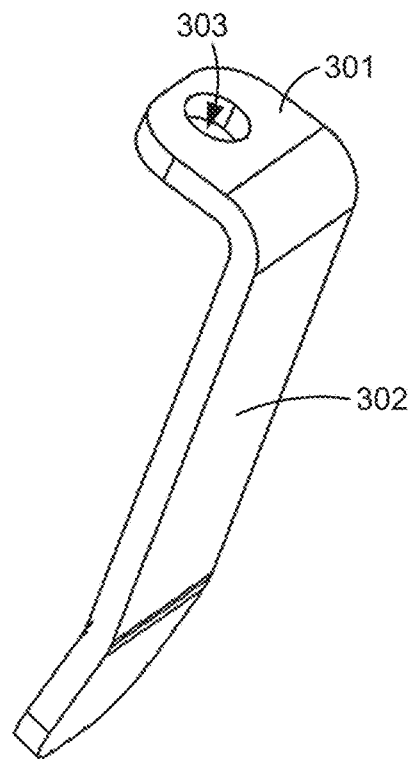
FIGS. 3A-3E show a spring for use in an optical component module of an autonomous vehicle LiDAR assembly according to embodiments of the present technology.
Figure 3B:
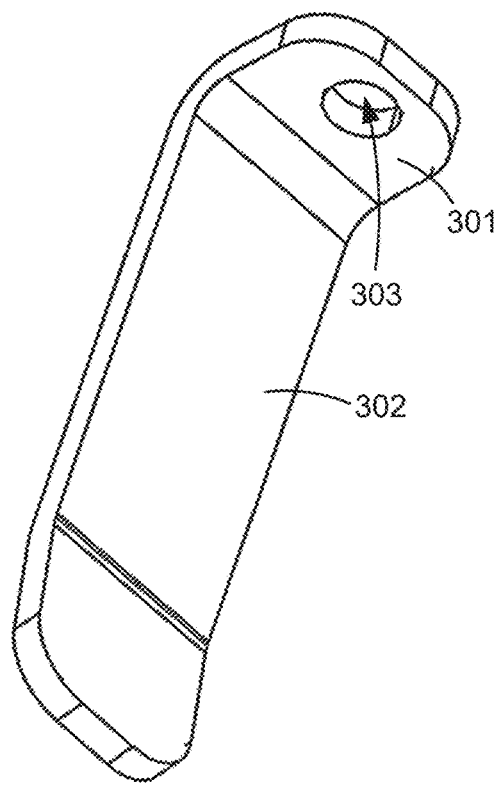
Figure 3C:
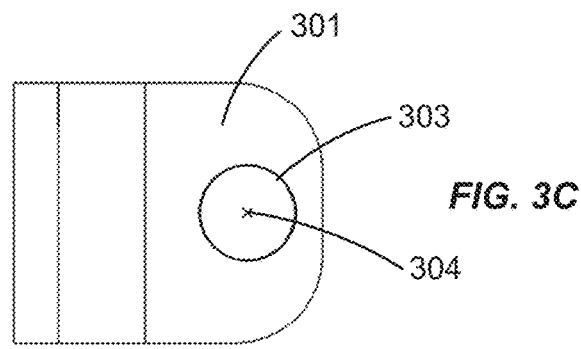
Figure 3D:
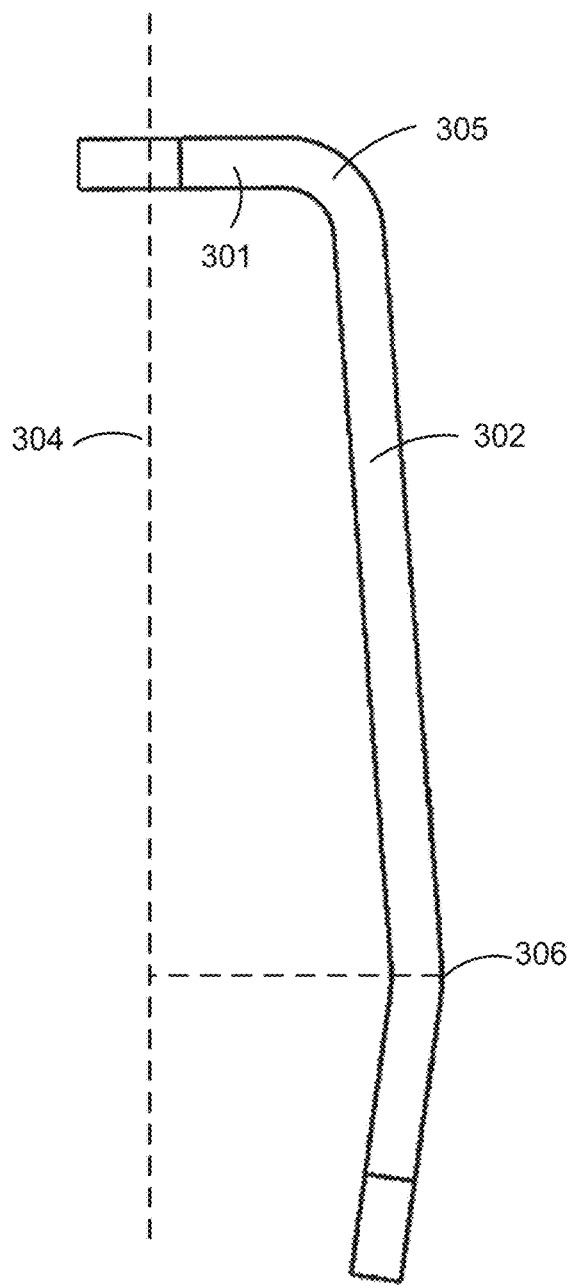
Figure 3E:
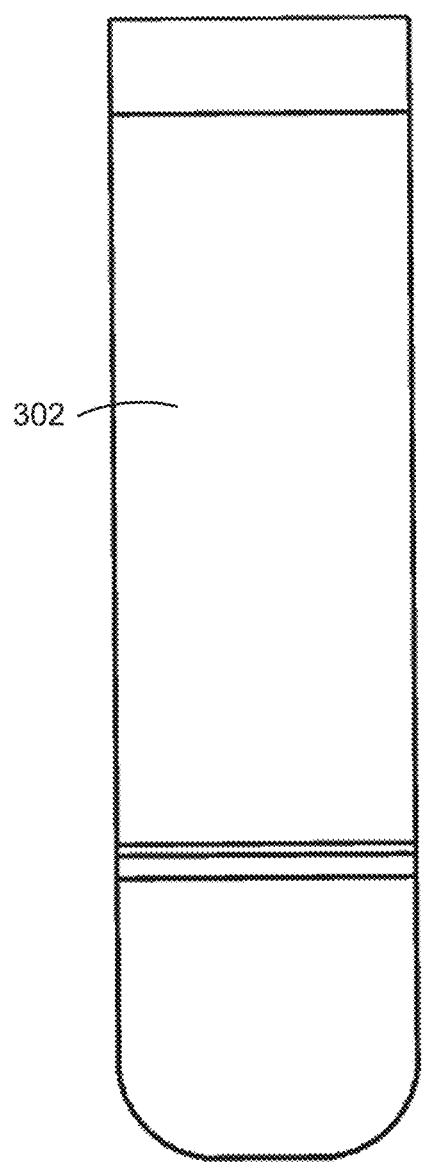

As noted above, the optical components 202 may be retained within the housing with one or more springs 300. In embodiments, the springs 300 may be arced cantilever springs, wherein the spring is fixed at only one end and includes a curved portion extending from the fixed end. FIGS. 3A-3E show an embodiment of a spring 300 of an arced cantilever spring. As shown in FIGS. 3A and 3B, a spring 300 may comprise a mounting portion 301 and a contact portion 302. As shown, the mounting portion 301 may be planar and rectangular. The mounting portion 301 defines a through hole 303 extending between a top surface and a bottom surface of the mounting portion 301. The hole 303 may be used to fixedly couple the spring 300 to the housing 201, for example with a press-fit. A longitudinal axis 304 of the spring 300 may be defined by the hole 303 as shown in FIGS. 3C and 3D.

The contact portion 302 of the spring 300 extends at a non-perpendicular angle from and is coupled to the mounting portion 301, as shown in FIG. 3C. As shown in FIG. 3D, the contact portion 302 extends substantially parallel to the longitudinal axis 304 of the spring 300. The contact portion 302 may have a bent, kinked, and/or curved profile, and be referred to herein as an arced profile, for example as shown in FIG. 3D. The contact portion 302 comprises a contact point 306, which is the area of the contact portion 302 furthest from the longitudinal axis 304 of the spring 300. The coupling section 305 between the mounting portion 301 and contact portion 302 and/or the contact portion itself 302 are shaped and comprises material in order to have resiliency so that the contact point 306 of the contact portion 302 may be moved from an unstressed position by an outside force toward the longitudinal axis 304 and be biased to return back to the unstressed position. With the mounting portion 301 fixedly coupled to the housing 201, this biasing back to the unstressed position allows the spring 300 to exert a clamping force to compress an optical component 202 between the contact point 306 of the spring 300 and a surface of the housing 201 in order to retain the optical component 202 within housing 201 of the optical component module 200. The perpendicular distance between the longitudinal axis 304 of the spring 300 and the contact point 306 of the contact portion 302 may be referred to as the unstressed spring distance. In embodiments, the unstressed spring distance may be between 1.3 mm and 1.4 mm.

In embodiments, the spring 300 is formed from a single piece of material, for example metal (e.g. steel, aluminum). The spring 300 may be formed by bending a rectangular strip of metal to form the coupling portion 305 between the mounting portion 301 and contact portion 302 and to form the arced profile of the contact portion 302.

Figure 4:
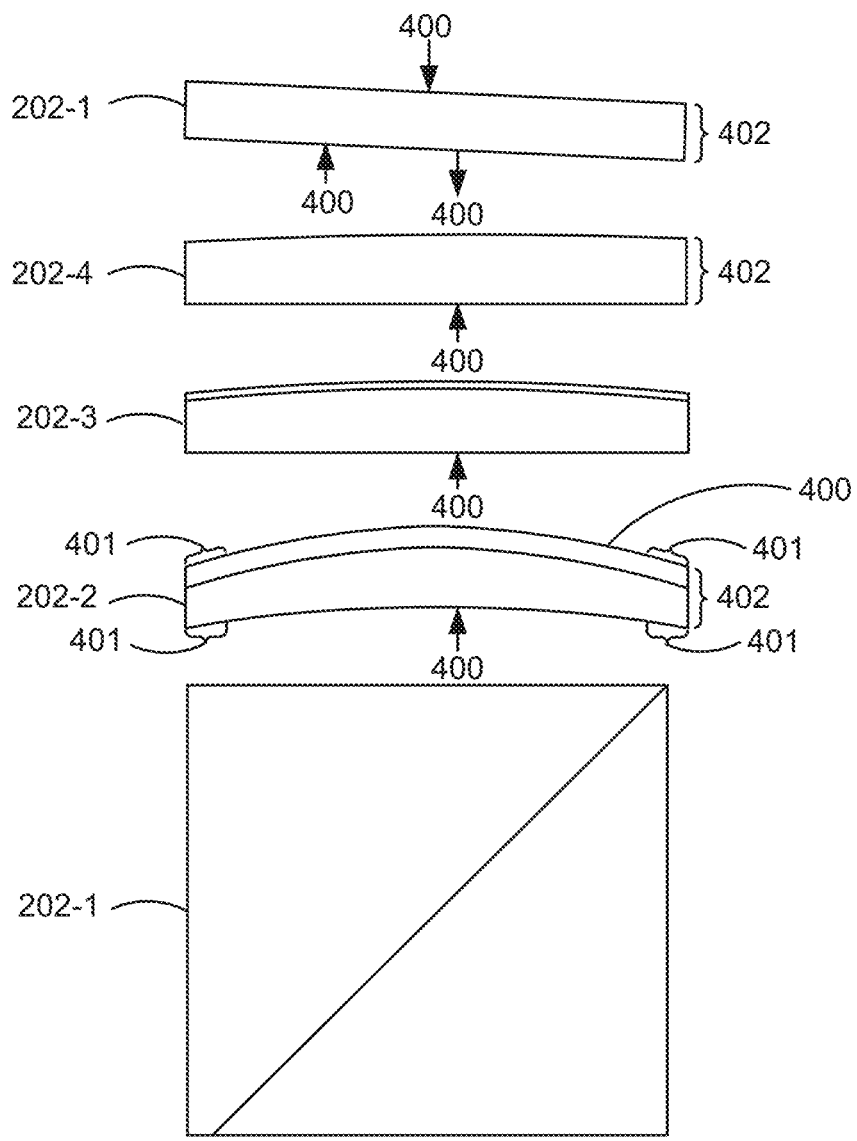
FIG. 4 shows optical components of an optical component module of an autonomous vehicle LiDAR assembly according to embodiments of the present technology.

FIG. 4 shows an example of a plurality of optical components 202. The optical components 202 may each be a combination of one or more of a lens, a filter, a beam splitter. In embodiments, optical components may include frames. The optical components may have planar, concave and/or convex surfaces. The optical components may be oriented with one or more of their surfaces perpendicular to the primary optical axis 207 of the optical component module 200, for example as shown with optical components 202-3 and 202-4 in FIG. 2C. Specifically, as shown, optical component 202-2, which is a lens, includes concave and convex surfaces, wherein the primary optical axis 207 extends perpendicularly through the center of the surfaces. Further, the optical components may be oriented with one or more of their surfaces oblique to the optical axis of the optical component module, for example as shown with optical component 202-5 in FIG. 2C. Specifically, as shown, optical component 202-5 includes a lens within a lens frame, the optical axis extends obliquely through the center of the lens. In embodiments, optical components 202 may be retained within the housing 201 with the springs 300 contacting one or more of the peripheral portions 401 of the surfaces 400 of the optical components 202. As shown, the distance between peripheral portions 401 of an optical component 200 defines the peripheral thickness 402 of the optical component 200. In embodiments, the peripheral thicknesses 402 of optical components may be between 2.73 mm and 2.83 mm, and as will be discussed below, the peripheral thickness may correspond to a combination of a slot depth within the housing 201 and the unstressed spring distance. In embodiments, an optical component 202 may have a uniform peripheral thickness or may have a variable peripheral thickness. As will be discussed in greater detail below, the springs 300 may be coupled to the housing 201 to and retain optical components with different peripheral thickness and/or accommodate a single optical components with variable peripheral thickness.

Figure 5A:
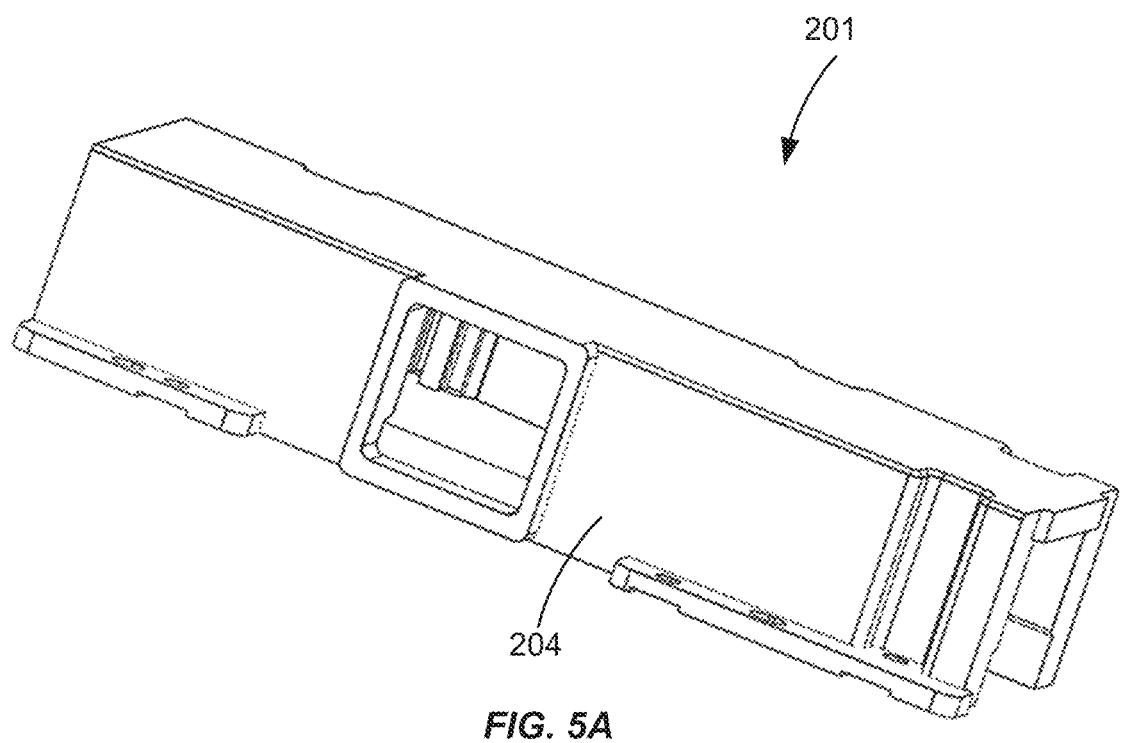
FIGS. 5A-5C show a housing of an optical component module of an autonomous vehicle LiDAR assembly according to embodiments of the present technology.
Figure 5B:
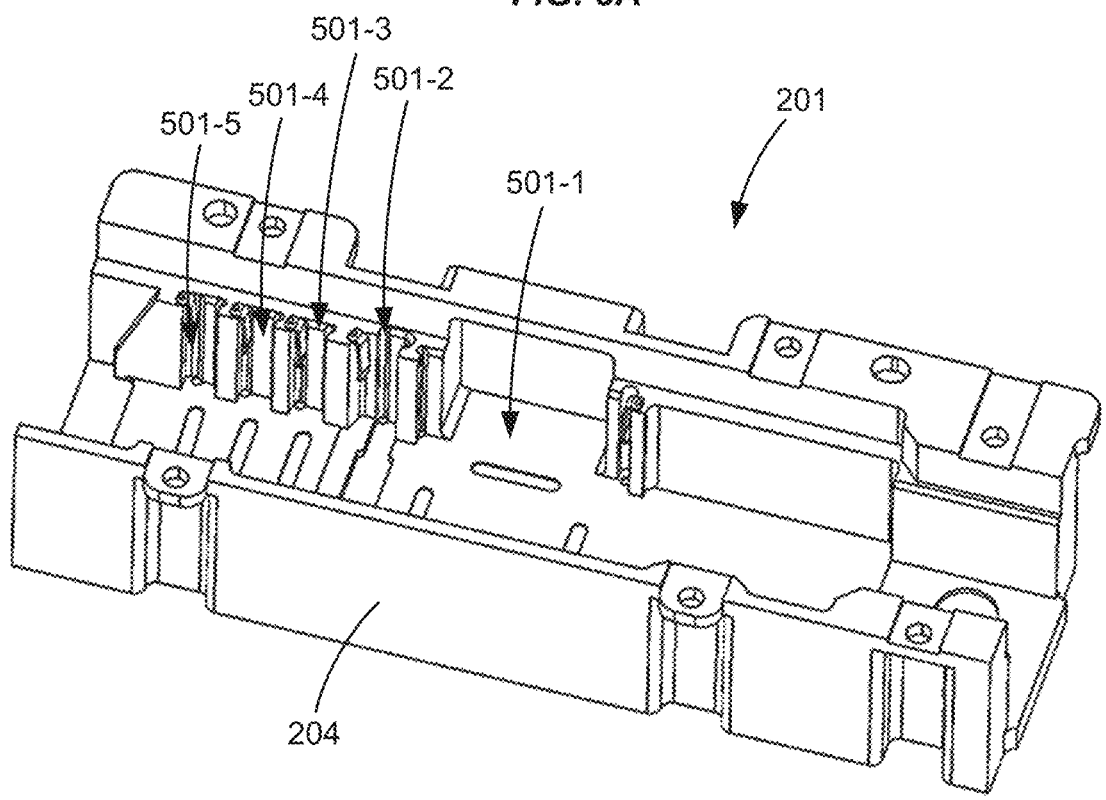
Figure 5C:
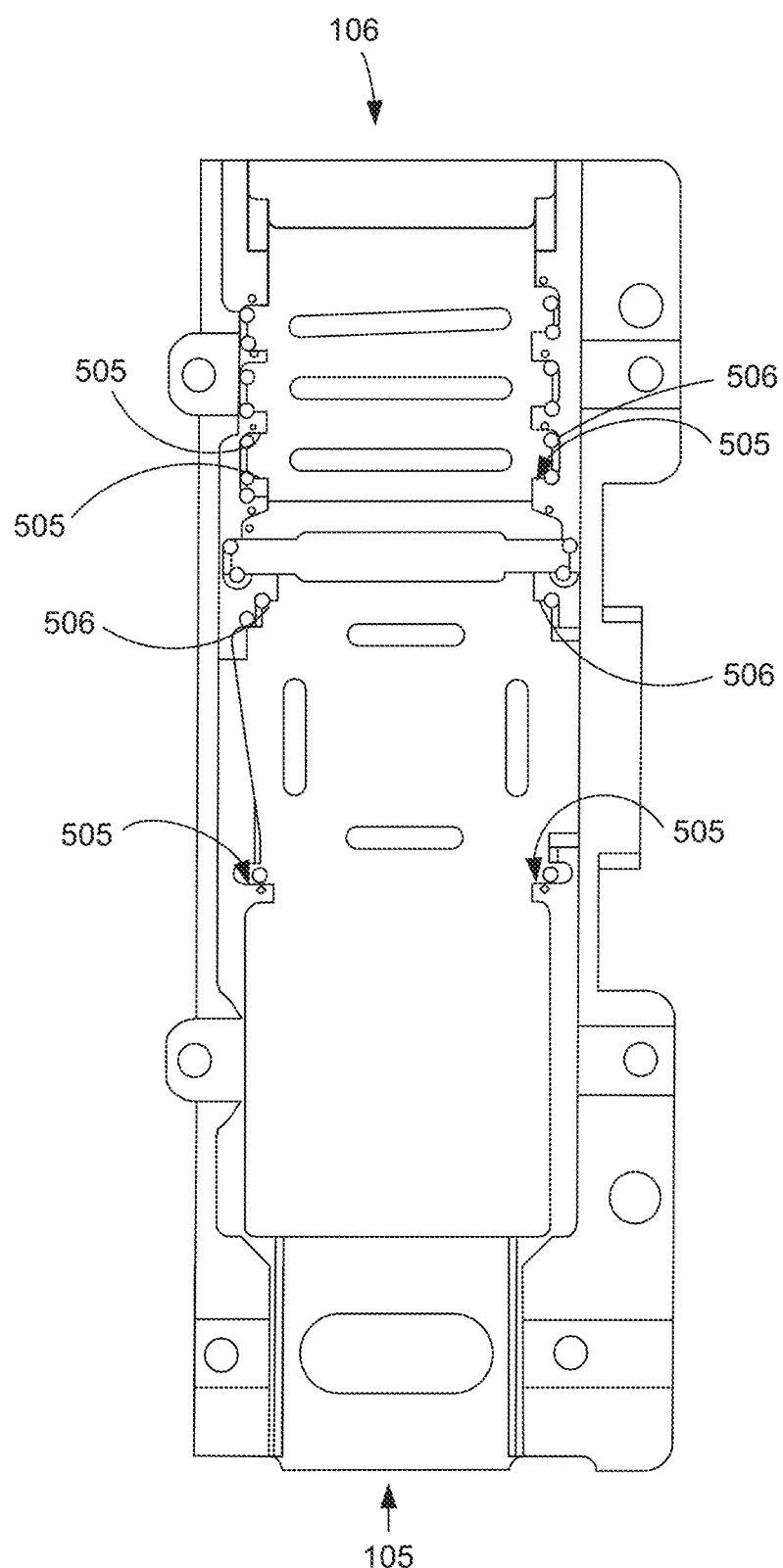

In embodiments, the optical components 202 may be positioned within slots 501 defined within the interior cavity of the housing 201. For example, the periphery of lens or lens frames containing lens may be positioned within the slots. Springs 300 may be fixedly coupled to the housing 201 and apply a clamping force to the optical components 202 in order to retain the optical components 202 within the slots. FIGS. 5A-5C shows views of the housing 201. A shown in FIGS. 5B and 5C, the interior cavity of housing 201 includes a plurality of slots 501. The slots 501 may include slot portions 502 defined in one or more of the sidewalls and or top side. The number of slots 501 may correspond to the number of optical components 202, wherein each optical component 202 is positioned in a dedicated slot 501. For example the five optical components 202-1-202-5 may be retained respectively in five slots 501-1-501-5.

Figure 6A:
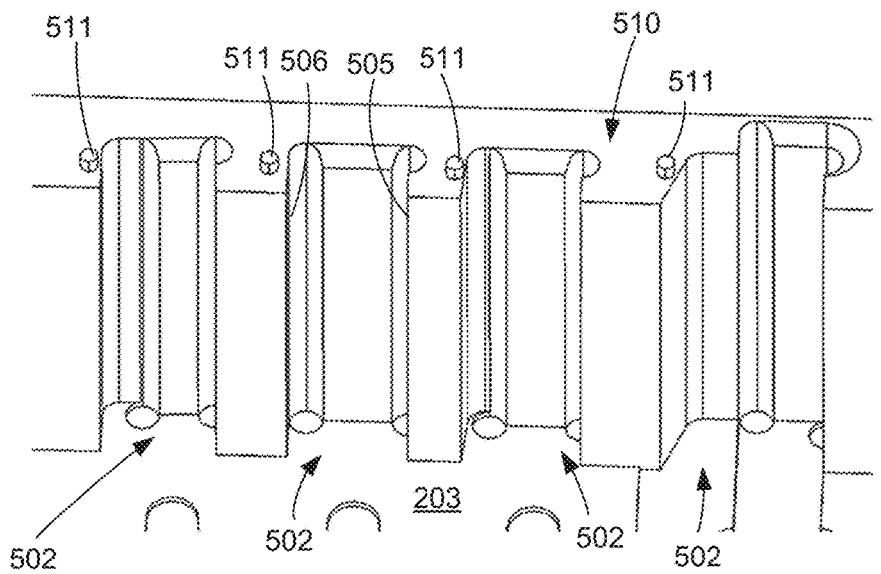
FIGS. 6A-6C show detailed assembly views of springs and a housing of an optical component module of an autonomous vehicle LiDAR assembly according to embodiments of the present technology.
Figure 6B:
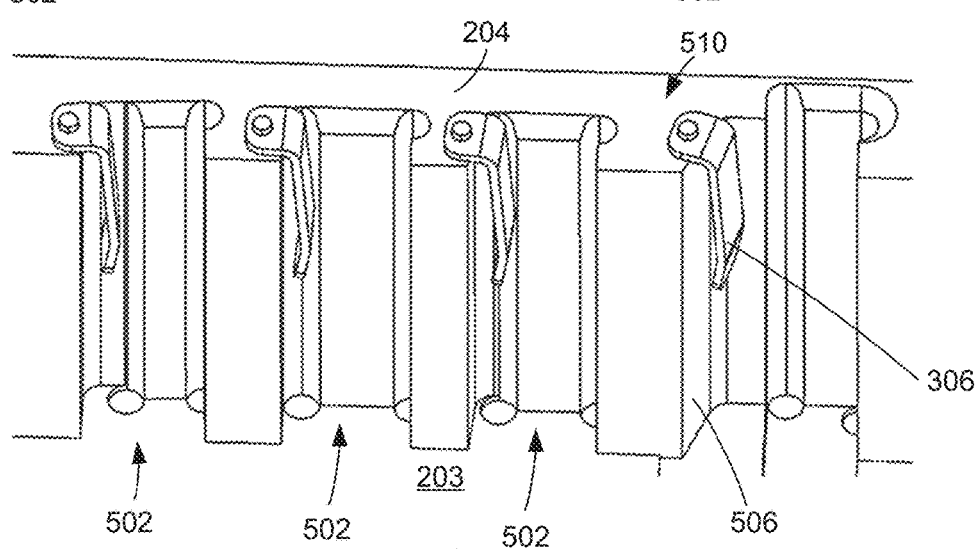
Figure 6C:
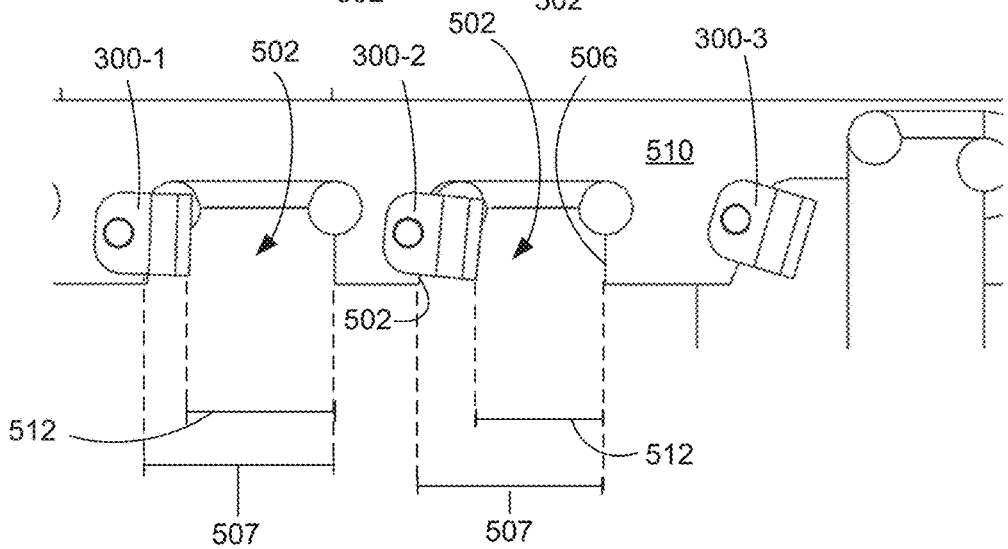

Each slot 501 may include two slot portions 502 each defined in one of the sidewall 204, for example as shown in FIGS. 6A-6C. Each slot portion may have a first slot surface 505 and a second slot surface 506. The first slot surface 505 of each slot 501 is more proximate to the first aperture 105 and faces the second aperture 106, and the second slot surface 506 of each slot 501 is more proximate to the second aperture 106 and faces the first aperture 105. The distance between the first slot surface 505 and the second slot surface 506 defines the slot depth 507, for example as shown in FIG. 6C. In embodiments, the slot depth 507 is between 3.42 mm and 3.52 mm. In embodiments, the slot depths 507 of each slot 501 may be the same or may be different. The slot depth 507 of each slot 501 may be based on the peripheral thickness 402 of the optical component(s) to be retained within the slot.

FIG. 6A shows a close-up view of a sidewall 204 of the interior cavity of a housing 201. As shown, the sidewall 204 defines a plurality of slot portions 502. In embodiments, the sidewalls 204 may define a recessed surface 510 recessed relative to the flange 205 or bottom surface of the housing 201, as shown in FIG. 6A. The distance between the recessed surface 510 and the top side 203 of the housing defines the slot height and the distance between the slot portions 502 on opposing sidewalls 204 defines the slot width. In embodiments, the slot height may range from 22 mm to 22.07 mm and the slot width may range from 11.95 mm to 12.05 mm.

To fixedly couple the springs the housing, the housing may include posts. For example, as shown in FIG. 6A, the sidewall 204 each include a post 511 extending from the recessed surface 510 for each slot portion 502. The posts 511 may extend from the recesses surface 510 toward the flange 205. The posts 511 may be integrally formed with the sidewalls 204, or may comprise rods positioned within holes in the recessed surface 510 of the sidewalls 204. As shown, the posts 511 may be cylindrical, however in some embodiments the posts may be other shapes. The shape of the posts may correspond to the shape of the mounting hole of the spring.

The posts may be used to fixedly couple a spring to be used with each slot portion. In embodiments, the posts 511 may be on the second slot side 506 of each slot portion 502, as shown in FIG. 6A. However, in embodiments, the posts 511 may be on the first slot side 505 of each slot portion 502 or the slot portion 502 may include posts 511 on both sides.

As shown in FIG. 6B, a spring 300 may be fixedly coupled to the posts 511. In embodiments, the spring may be coupled to the post with a press-fit. For example, the post 511 may be inserted into the mounting hole 303 of the spring 300 to that the mounting portion 301 contacts the recessed surface 510 with the contact portion 302 within the slot portion 502 between the first slot side 505 and second slot side 506. The end of the contact portion 302 of the spring 300 opposite the coupling portion 305 may contact the second slot surface 506 or may not contact the second slot surface.

As shown in FIG. 6B, the contact point 306 in the unstressed state is spaced from the second slot surface 506. The distance between the contact point 306 of the spring 300 in the unstressed state and the first slot surface 505 of each slot portion 502 may be referred to as the unstressed clamping depth 512. To retain an optical component 202 within a slot 501, the spring 300 is coupled to the post 511 so that the unstressed clamping depth 512 is less than the peripheral depth 402 of the respective optical component 202 so that inserting the optical component within the slot portion 502 between the spring 300 and the first slot surface 505 results in a deflection of the contact point 306 toward the second slot surface 506, resulting in a clamping force holding the optical component 202 between the contact point 306 and the first slot surface 505, as shown in FIG. 32C.

The slot depths 507 of each slot and positions of each of the posts 511, in directions of both the primary optical axis 207 and second optical axis 208, may be selected so that identical springs 300, or substantially identical springs 300, may be used to retain each of the optical components 202 within the housing 201. As used here, the term "substantially identical springs" may be used to describe springs 300 having at least the same relative positions of the hole 303, longitudinal axis 304 and contact point 306 so that two springs being substantially identical to each other can be interchanged with each other and result in the same unstressed clamping depth. In embodiments, it is beneficial for an optical component module to use identical or substantially identical springs to retain one or more, including all, of the optical components within the housing, for example due to ease in changing any of the optical components without needing a spring specific to the optical component.

In embodiments, the spring may be coupled to the post in a plurality of radial orientations, for example as shown in FIG. 6C. Specifically, as shown spring 300-1 is radially oriented substantially parallel to the longitudinal axis of the housing 201, spring 300-2 is radially oriented more clockwise relative to spring 300-1, and 300-3 is radially oriented more clockwise relative to spring 300-2. Different radial orientations of the springs 300 allow for the contact point 306 of the spring 300 in the unstressed stated to be positioned different distances from the first slot surface 505 and second slot surface 506, and therefore allow for a plurality of different unstressed clamping depths 512 to be achieved using the same spring, same slot depth, and same post position. The ability of being able to select different unstressed clamping depths is beneficial in allowing the same spring to be used with various optical components with different peripheral thicknesses, and therefore allows substantially identical springs to be used universally for all optical components in an optical component module.

In embodiments, the optical components may be retained within the housing without the use of adhesive between the optical component and the housing and/or spring. This is beneficial in allowing an optical component to be removed and re-inserted without having to remove adhesive and/or replace the optical component and/or spring due to set adhesive have an effect on retention and alignment of the re-inserted optical component.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the examples, alternative examples, etc., and the concepts thereof may be applied to any other examples described and/or within the spirit and scope of the disclosure.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

What is claimed is:

1. A method of retaining optical components within a housing, wherein the housing comprises a plurality of slots and a plurality of posts, the method comprising:
   coupling a first spring of a plurality of springs to a first post of the plurality of posts at a first radial orientation relative to a longitudinal axis of the housing so that the first spring extends into a first slot of the plurality of slots;
   coupling a second spring of the plurality of springs to a second post of the plurality of post in a second radial orientation relative to the longitudinal axis of the housing, different than the first radial orientation, so that the second spring extends into a second slot of the plurality of slots;
   inserting a first optical component into the first slot so that the first spring exerts a first clamping force in order to retain the first optical component within the first slot; and
   inserting a second optical component into the second slot so that the second spring exerts a second clamping force in order to retain the second optical component within the second slot,
   wherein the first spring and the second spring are identical or substantially identical.

2. The method of claim 1, wherein the first spring and the second spring each comprise:
   a mounting portion defining a hole; and
   an arced contact portion extending form the mounting portion,
   wherein coupling the first spring to the first post comprises forming a press fit between the hole of the mounting portion of the first spring and the first post, and
wherein coupling the second spring to the second post comprises forming a press fit between the hole of the mounting portion of the second spring and the second post.

3. The method of claim 2, wherein inserting the first optical component into the first slot comprises compressing the arced contact portion of the first spring in order to generate the first clamping force retaining the first optical component within the first slot; and
   wherein inserting the second optical component into the second slot comprises compressing the arced contact portion of the second spring in order to generate the second clamping force retaining the second optical component within the second slot.

4. The method of claim 3, wherein the first slot defines a first slot depth between a first slot side and a first spring side,
   wherein the second slot defines a second slot depth between a second slot side and a second spring side,
   wherein a first uncompressed spring distance is defined between the contact portion of the first spring and the first slot side,
   wherein a second uncompressed spring distance is defined between the contact portion of the second spring and the second slot side, and
   wherein the first slot depth is different than the second slot depth or the first uncompressed spring distance is different than the second uncompressed spring distance.

5. The method of claim 4, wherein the first slot depth is the same as the second slot depth, and
   wherein the first uncompressed spring distance is different than the second uncompressed spring distance.

6. The method of claim 4, wherein the first uncompressed spring distance is the same as the second uncompressed spring distance, and
   wherein the first slot depth is different than the second slot depth.

7. The method of claim 4, wherein the first optical component defines a first peripheral thickness retained between the contact portion of the first spring and the first slot side, and
   wherein the second optical component defines a second peripheral thickness, different than the first peripheral thickness, retained between the contact portion of the second spring and the second slot side.

8. The method of claim 1, wherein the first spring and the second spring are identical.

9. The method of claim 1, wherein no adhesives are used to bond the first optical component nor the second optical component to the housing or to the first or second springs.

10. The method of claim 1, wherein the first optical component and the second optical component each comprise at least one of a lens, a filter, or a beam splitter.

11. A LiDAR system, comprising:
   a chassis;
   an optical component module coupled to a chassis; and
   a detection or transmission module configured to be optically aligned with the optical component module so that a path of a laser beam emitted from a laser module of the transmission module is oriented with an optical path in the optical component module to a detection sensor of the detection module;
   wherein the optical component module comprises:
      a housing, wherein the housing comprises a plurality of slots and a plurality of posts,
      a first spring of a plurality of springs coupled to a first post of the plurality of posts at a first radial orientation relative to a longitudinal axis of the housing so that the first spring extends into a first slot of the plurality of slots;
      a second spring of the plurality of springs coupled to a second post of the plurality of post in a second radial orientation relative to the longitudinal axis of the housing, different than the first radial orientation, so that the second spring extends into a second slot of the plurality of slots;
      a first optical component positioned in the first slot so that the first spring exerts a first clamping force retaining the first optical component within the first slot; and
      a second optical component positioned in the second slot so that the second spring exerts a second clamping force retaining the second optical component within the second slot,
      wherein the first spring and the second spring are identical or substantially identical.

12. The system of claim 11, wherein the first spring and the second spring each comprise:
   a mounting portion defining a hole; and
   an arced contact portion extending form the mounting portion,
   wherein the first spring is coupled to the first post with a press fit between the hole of the mounting portion of the first spring and the first post, and wherein the second spring is coupled to the second post with a press fit between the hole of the mounting portion of the second spring and the second post.

13. The system of claim 12, wherein the first optical component compresses the arced contact portion of the first spring in order to generate the first clamping force retaining the first optical component within the first slot; and wherein the second optical component compresses the arced contact portion of the second spring in order to generate the second clamping force retaining the second optical component within the second slot.

14. The system of claim 13, wherein the first slot defines a first slot depth between a first slot side and a first spring side, wherein the second slot defines a second slot depth between a second slot side and a second spring side, wherein a first uncompressed spring distance is defined between the contact portion of the first spring and the first slot side, wherein a second uncompressed spring distance is defined between the contact portion of the second spring and the second slot side, and wherein the first slot depth is different than the second slot depth or the first uncompressed spring distance is different than the second uncompressed spring distance.

15. The system of claim 14, wherein the first slot depth is the same as the second slot depth, and wherein the first uncompressed spring distance is different than the second uncompressed spring distance.

16. The system of claim 14, wherein the first uncompressed spring distance is the same as the second uncompressed spring distance, and wherein the first slot depth is different than the second slot depth.

17. The system of claim 14, wherein the first optical component defines a first peripheral thickness retained between the contact portion of the first spring and the first slot side, and wherein the second optical component defines a second peripheral thickness, different than the first peripheral thickness, retained between the contact portion of the second spring and the second slot side.

18. The system, of claim 17, wherein the first spring and the second spring are identical.

19. The system of claim 11, wherein no adhesives are used to retain the first optical component nor the second optical component within the housing or to the first or second springs.

20. The system of claim 11, wherein the first optical component and the second optical component each comprises at least one of a lens, a filter, or a beam splitter.

* * * * *